US006567801B1

United States Patent
Chiang et al.

(10) Patent No.: US 6,567,801 B1
(45) Date of Patent: May 20, 2003

(54) AUTOMATICALLY INITIATING A KNOWLEDGE PORTAL QUERY FROM WITHIN A DISPLAYED DOCUMENT

(75) Inventors: Alice Chiang, Portola Valley, CA (US); Brian Richard James Heumann, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/527,301

(22) Filed: Mar. 16, 2000

(51) Int. Cl.[7] ............................ G06F 17/30; G06F 7/00
(52) U.S. Cl. ............................................. 707/3; 707/4
(58) Field of Search ............................ 707/3, 513, 4, 707/5; 706/46

(56) References Cited

U.S. PATENT DOCUMENTS

| | | | |
|---|---|---|---|
| 5,379,366 A | 1/1995 | Noyes | 395/54 |
| 5,634,051 A | 5/1997 | Thomsen | 395/605 |
| 5,708,825 A | 1/1998 | Sotomayor | 395/762 |
| 5,768,578 A | 6/1998 | Kirk et al. | 395/611 |
| 5,802,530 A | 9/1998 | Van Hoff | 707/513 |
| 5,842,206 A | 11/1998 | Sotomayor | 707/5 |
| 5,864,863 A | 1/1999 | Burrows | 707/103 |
| 5,877,765 A | 3/1999 | Dickman et al. | 345/349 |
| 5,905,492 A | 5/1999 | Straub et al. | 345/333 |
| 5,907,837 A | 5/1999 | Ferrel et al. | 707/3 |
| 5,913,215 A | 6/1999 | Rubinstein et al. | 707/10 |
| 5,918,013 A | 6/1999 | Mighdoll et al. | 395/200.47 |
| 6,047,251 A | 4/2000 | Pon et al. | 704/1 |
| 6,122,647 A * | 9/2000 | Horowitz et al. | 707/513 |
| 6,178,416 B1 * | 1/2001 | Thompson et al. | 707/3 |
| 6,211,879 B1 | 4/2001 | Soohoo | 345/357 |
| 6,236,987 B1 * | 5/2001 | Horowitz et al. | 707/3 |
| 6,249,283 B1 * | 6/2001 | Ur | 345/339 |
| 6,256,623 B1 | 7/2001 | Jones | 707/3 |
| 6,341,306 B1 | 1/2002 | Rosenschein et al. | 709/217 |
| 6,356,886 B1 * | 3/2002 | Doyle | 706/46 |
| 6,363,378 B1 * | 3/2002 | Conklin et al. | 707/5 |
| 6,453,312 B1 * | 9/2002 | Goiffon et al. | 707/3 |

OTHER PUBLICATIONS

Tan Sian Lip and Chan Huang Send (1990), AuditPro–Integrating Knowledge–Based Technology with Diagramming Tools for Auditors, pp. 173–183.*

L. Marinos (1990), Global Knowledge about Local Dependencies in an Intergrated Database Environment, pp. 783–791.*

Adel Shrufi and Thodoros Topaloglou (1995), Query Processing for Knowledge Bases Using Join Indices, pp. 158–166.*

Gert Schmeltz Pedersen (1993), A browser for bibliographic information retrieval, based on an application of lattice theory, pp. 270–279.*

* cited by examiner

Primary Examiner—Safet Metjahic
Assistant Examiner—Merilyn P Nguyen
(74) Attorney, Agent, or Firm—Madson & Metcalf (57) ABSTRACT

A system for automatically initiating a query of a knowledge portal from within a displayed document includes a word designation module configured to receive a user designation of at least one word of the document; an object identification module configured to automatically identify a first object within the knowledge portal corresponding to the at least one designated word; a query formulation module configured to automatically formulate a query for identifying at least one additional object within the knowledge portal having a relationship with the first object; and a query initiation module configured to automatically direct the knowledge portal to initiate the query.

27 Claims, 11 Drawing Sheets

AUTOMATICALLY INITIATING A KNOWLEDGE PORTAL QUERY FROM WITHIN A DISPLAYED DOCUMENT

BACKGROUND OF THE INVENTION

Field of the Invention

The present invention relates generally to knowledge portals. More particularly, the present invention relates to a system and method for automatically initiating a knowledge portal query from within a document displayed by a document viewer.

Identification of Copyright

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Relevant Technology

In recent years, the art of knowledge management has assumed an important role in helping managers to make business decisions. Knowledge management involves the computer-assisted discovery, capture, organization, and sharing of knowledge. A knowledge portal is one of the software tools used in the practice of knowledge management. A variety of knowledge portals are known, one example of which is KnowledgeX™, available from IBM Corporation.

Typically, a knowledge portal organizes knowledge into objects and relationships. Objects correspond to such real-world entities as people, places, things, and documents. Relationships link various objects within the knowledge portal.

Knowledge in the form of objects and relationships is generally stored within a knowledge catalog, also known as a knowledge base. Sources of knowledge may include human experts, company files, web pages, document management systems, databases, data warehouses, datamarts, and the like.

Knowledge, portals generally operate on dedicated servers. A client program, such as a Web browser or a custom knowledge portal client, may be used to retrieve knowledge from a knowledge portal through constructed questions or queries.

Often, such queries are directed to relationships between the objects stored in the knowledge catalog. For example, a user may pose the query, "who are the competitors of ABC company?" The knowledge portal may respond with a list of objects in the knowledge catalog having a "competitor" relationship with ABC company.

Additionally, knowledge portals may be used to generate a knowledge map, which is a view of a section of the knowledge catalog. Knowledge maps allow the user to visualize, manipulate, and navigate the objects and relationships described in the knowledge catalog, generally by means of a graphical user interface.

The World Wide Web (hereinafter referred to as the "Web") is a collection of servers within the Internet from which specially formatted documents may be retrieved by means of a Web browser. Typically, Web documents are formatted in the HyperText Markup Language (HTML), which supports hyperlinks between and within documents, as well as a variety of multimedia elements, including graphics, audio and video.

A Web browser is a client application that allows a user to selectively retrieve and display HTML documents, as well as to selectively follow hyperlinks. Currently, two of the most popular Web browsers are Netscape Navigator™ and Microsoft Internet Explorer™.

A hyperlink is an element within an HTML document that directs the Web browser to another place in the same document, or to an entirely different document, when the hyperlink is followed. Hyperlinks may be attached to words, phrases, icons, and other objects displayed within the document Typically, a user may follow a hyperlink by "clicking" on the hyperlink with a pointing device, such as a mouse. Hyperlinks are an essential part of any hypertext system, of which the Web is the most prominent example.

Documents are identified within the Web by a Uniform Resource Locator (URL), also commonly referred to as a Web address. A URL identifies the domain name or Internet Protocol (IP) address of the Web server containing the document, as well as the location of the document within the server.

Often, while reading a document displayed by a Web browser or dedicated knowledge portal client, a user may identify a word or phrase corresponding to an object represented in a knowledge portal. For example, the user may read the words, "ABC company," and desire to know the competitors of ABC company.

Potentially, the author of the document anticipated the user's interest and included a hyperlink or other mechanism configured to query a knowledge portal to selectively retrieve and display the competitors of ABC company.

More realistically, however, such a hyperlink or mechanism is not included. As a result, the user is generally required to manually open a knowledge portal client (if not currently open), formulate an appropriate query, and manually initiate the query.

Unfortunately, many users find the above-described process too time-consuming or complicated for casually querying a knowledge portal. Moreover, if the same Web browser or knowledge portal client is used to query the knowledge portal as was used to display the document including the desired word or phrase, the user's visual and mental context is lost each time the knowledge portal interface replaces the document.

To return to the original document and restore the user's context, the user must typically click on a "Back" button, or the like, introducing yet another step into the process. Moreover, it is frequently impossible to restore the user's context to the state in which it existed before the query was performed.

Accordingly, what is needed is a system and method for automatically initiating a knowledge portal query from within a document displayed by a document viewer, such as a Web browser or other knowledge portal client. What is also needed is a system and method for preserving the user's visual and mental context during the query process.

SUMMARY OF THE INVENTION

The present invention solves many or all of the foregoing problems by introducing a system and method for automatically initiating an knowledge portal query from within a document displayed by a document viewer, while preserving the user's visual and mental context throughout the query process.

In one aspect of the invention, a system for automatically initiating a query of a knowledge portal from within a displayed document includes a word designation module configured to receive a user designation of at least one word of the document; an object identification module configured to automatically identify a first object within the knowledge portal corresponding to the at least one designated word; a query formulation module configured to automatically formulate a query for identifying at least one additional object within the knowledge portal having a relationship with the first object; and a query initiation module configured to automatically direct the knowledge portal to initiate the query.

In another aspect of the invention, a computer-implemented method for automatically initiating a query of a knowledge portal from within a displayed document includes the steps of receiving a user designation of at least one word of the document; automatically identifying a first object within the knowledge portal corresponding to the at least one designated word; automatically formulating a query for identifying at least one additional object within the knowledge portal having a relationship with the first object; and automatically directing the knowledge portal to initiate the query.

In yet another aspect of the invention, an article of manufacture comprises a program storage medium readable by a processor and embodying one or more instructions executable by the processor to perform the above-described method for automatically initiating a knowledge portal query from within a document displayed by a document viewer.

These and other objects, features, and advantages of the present invention will become more fully apparent from the following description and appended claims, or may be learned by the practice of the invention as set forth hereinafter.

BRIEF DESCRIPTION OF THE DRAWINGS

These and other more detailed and specific objects and features of the present invention are more fully disclosed in the following specification, with reference to the accompanying drawings, in which.

DETAILED DESCRIPTION OF THE PREFERRED EMBODIMENTS

Certain preferred embodiments of the invention are now described with reference to the Figures, where like reference numbers indicate identical or functionally similar elements. The components of the present invention, as generally described and illustrated in the Figures, may be implemented in a variety of ways. Thus, the following more detailed description of the embodiments of the system and method of the present invention, as represented in the Figures, is not intended to limit the scope of the invention, as claimed, but is merely representative of presently preferred embodiments of the invention.

Throughout the following description, various components of the invention are described as "modules." In one embodiment, the modules may be implemented as software, hardware, firmware, or any combination thereof, using well known techniques understood by those skilled in the art.

For example, as used herein, a module may include any type of computer instruction or computer executable code located within a memory device and/or transmitted as electronic signals over a system bus or network. An identified module may, for instance, comprise one or more physical or logical blocks of computer instructions, which may be organized as an object, a procedure, a function, or the like.

The identified modules need not be located together, but may comprise disparate instructions stored in different locations, which together implement the described functionality of the module. Indeed, a module may comprise a single instruction, or many instructions, and may even be distributed among several discrete code segments, within different programs, and across several memory devices.

Figure 1:
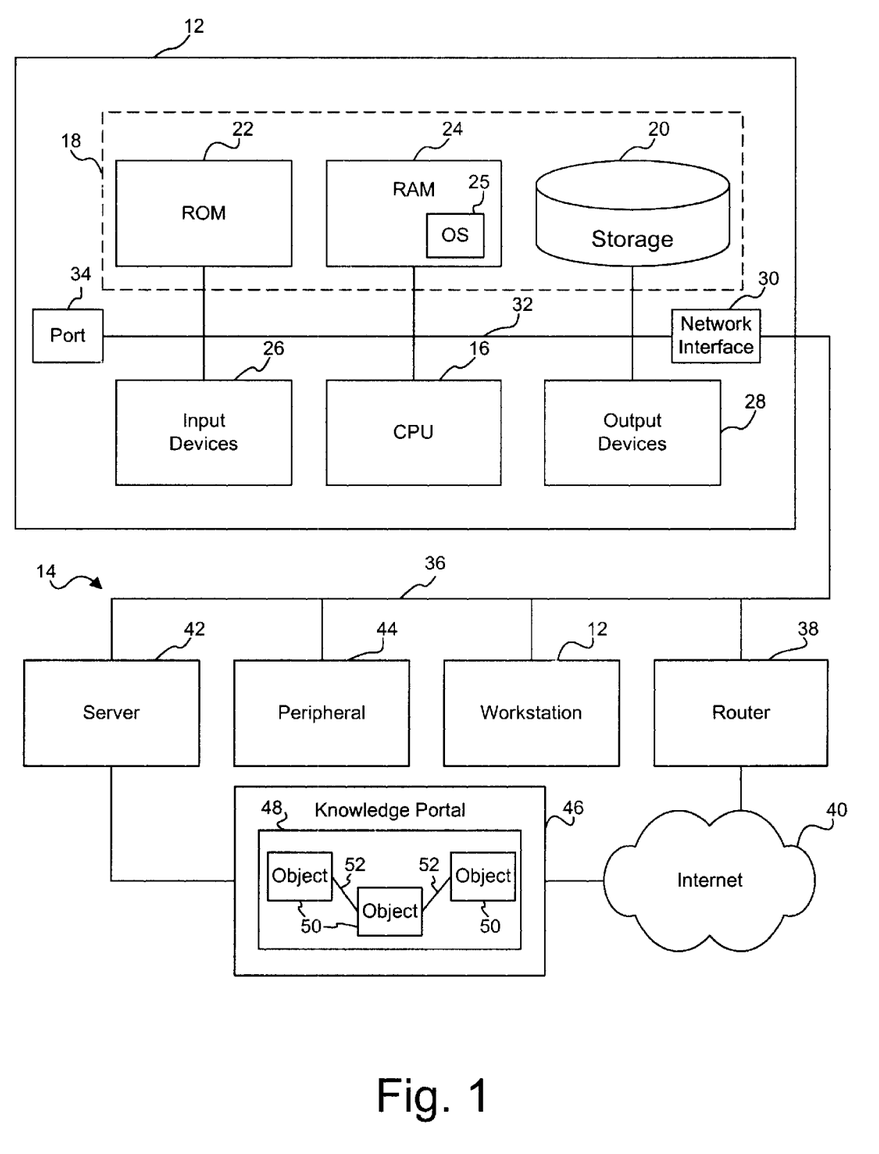
FIG. 1 is a schematic block diagram of a computer system suitable for implementing one embodiment of the invention.

FIG. 1 is a schematic block diagram illustrating a computer system 10 in which a plurality of modules may be hosted on one or more computer workstations 12 connected via a network 14. The network 14 may comprise a wide area network (WAN) or local area network (LAN) and may also comprise an interconnected system of networks, one particular example of which is the Internet.

A typical computer workstation 12 may include a central processing unit (CPU) 16. The CPU 16 may be operably connected to one or more memory devices 18. The memory devices 18 are depicted as including a non-volatile storage device 20, such as a hard disk drive or CD-ROM drive, a read-only memory (ROM) 22, and a random access memory (RAM) 24.

Preferably, the computer workstation 12 operates under the control of an operating system (OS) 25, such as OS/2®, WINDOWS NT®, WINDOWS®, UNIX®, and the like. In one embodiment, the OS 25 provides a graphical user interface (GUI) to enable the user to visually interact with the modules of the present invention. In one embodiment, the OS 25 may be loaded from the non-volatile storage device 20 into the RAM 24 at the time the workstation 12 is booted.

The workstation 12 may also include one or more input devices 26, such as a mouse and/or a keyboard, for receiving inputs from a user. Similarly, one or more output devices 28, such as a monitor and/or a printer, may be provided within, or be accessible from, the workstation 12.

A network interface 30, such as an Ethernet adapter, may be provided for coupling the workstation 12 to the network 14. In one embodiment, the workstations 12 may be coupled to the network 14 via a distributed remote data architecture (DRDA). Where the network 14 is remote from the workstation 12, the network interface 30 may comprise a modem, and may connect to the network 14 through a local access line, such as a telephone line.

Within any given workstation 12, a system bus 32 may operably interconnect the CPU 16, the memory devices 18, the input devices 26, the output devices 28, the network interface 30, and one or more additional ports 34, such as parallel ports and/or RS-232 serial ports.

The system bus 32 and a network backbone 36 may be regarded as data carriers. Accordingly, the system bus 32 and the network backbone 36 may be embodied in numerous configurations, such as wire and/or fiber optic lines, as well as "wireless" communication channels using visible light, infrared, and radio frequencies.

In general, the network 14 may comprise a single local area network (LAN), a wide area network (WAN), several adjoining networks, an intranet, an extranet, or as in the manner depicted, a system of interconnected networks such as the Internet 40. The individual workstations 12 may communicate with each other over the backbone 36 and/or over the Internet 40 using various communication techniques.

For instance, different communication protocols, e.g., ISO/OSI, IPX, TCP/IP, may be used within the network 14. In the case of the Internet 40, however, a layered communications protocol (i.e. TCP/IP) generally best enables communications between the differing networks 14 and workstations 12.

The workstations 12 may be coupled via the network 14 to application servers 42, and/or other resources or peripherals 44, such as scanners, digital cameras, fax machines, and the like. External networks, such as the Internet 40, may be coupled to the network 14 through a router 38.

In one embodiment, the workstations 12 are configured to access a knowledge portal 46. As noted above, a knowledge portal 46 is a software tool for assisting a user in discovering, capturing, organizing, and sharing knowledge. A variety of knowledge portals 46 are known to those skilled in the art, such as KnowledgeX™, available from IBM Corporation. The workstation 12 may access the knowledge portal 46, for example, via a server 42 or the Internet 40.

As previously noted, a knowledge portal 46 generally includes a knowledge catalog 48 (or knowledge base), which is a categorized repository of objects 50 and relationships 52. The structure of the knowledge catalog 48 may be conceptualized as a node graph, wherein the objects 50 are nodes and the relationships 52 are edges.

Objects 50 within the knowledge catalog 48 may include various types or classifications of information items, such as organizations, people, documents, places, events. Specific examples of objects 50 within a knowledge portal 46 may include, for instance, IBM, Lou Gerstner, New York City, and the like. Examples of common relationships might include vendor, competitor, member, employer, employee, and the like.

The knowledge catalog 48 of a knowledge portal 46 may be implemented within a conventional database management system (DBMS), such as DB2™ for OS/390™, available from IBM Corp. Preferably, however, the implementation details of the knowledge portal 46 are hidden from the user. For example, rather than accessing knowledge data by referencing tables, indexes, and the like, the user refers to objects 50 and relationships 52.

Figure 2:
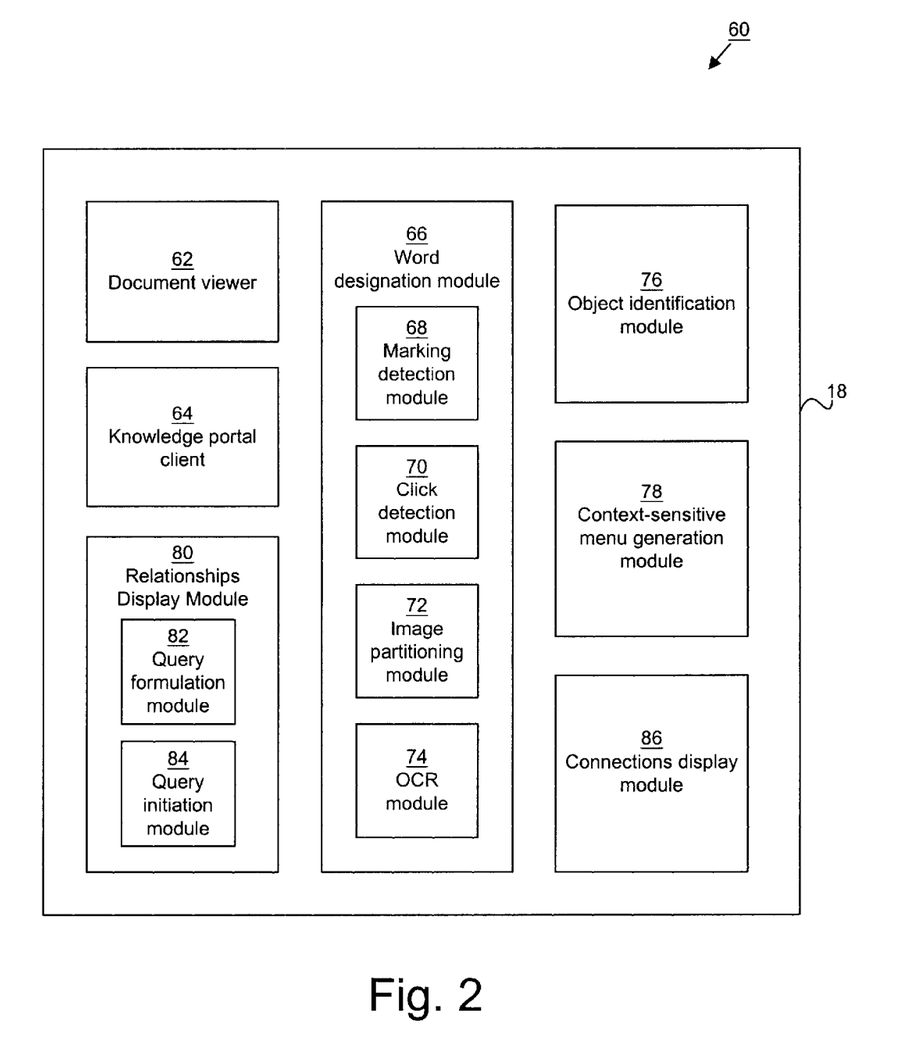
FIG. 2 is a schematic block diagram illustrating the components of a system for automatically initiating a knowledge portal query from within a displayed document according to one embodiment of the invention.

Referring now to FIG. 2, the memory devices 18 of FIG. 1 are depicted as storing therein a system 60 for automatically querying a knowledge portal 46. In one embodiment, the system 60 includes a plurality of modules containing executable code for performing the methods of the present invention. The memory devices 18 in which the modules are located may be found within a single workstation 12, or may be distributed among a plurality of workstations 12 in the network 14. Although the modules are described herein as separate functional units, the various modules may be combined or integrated into a single software application or device. Likewise, the functionality of any one module may be implemented using two or more modules.

Preferably, the system 60 includes a document viewer 62. In one embodiment, the document viewer 62 may comprise a conventional Web browser, such as Netscape Navigator™ or Microsoft Internet Explorer™, or a dedicated knowledge portal client provided by a knowledge portal 46 such as KnowledgeX™. In an alternative embodiment, however, the document viewer 62 may comprise a word processor, such as Microsoft Word™, or a portable document format (PDF) reader, such as Adobe Acrobat™.

In one embodiment, the system 60 also includes a knowledge portal client 64 for accessing a knowledge portal 46. The knowledge portal client 64 may, for example, comprise a Web browser or a custom tool provided by the knowledge portal 46. As described in greater detail hereafter, the knowledge portal client 64 and the document viewer 62 preferably operate within separate "windows" provided by the operating system 25. The concept of a window is well known to those skilled in the art of graphical user interfaces.

Preferably, the system 60 also includes a word designation module 66, which is described below in greater detail in relation to FIG. 6. For ease of description, the word designation module 66 is depicted as including a marking detection module 68, a click detection module 70, an image partitioning module 72, and an optical character recognition (OCR) module 74. However, in alternative embodiments, the foregoing modules may exist independently of the word designation module 66.

Preferably, the system 60 also includes an object identification module 76 and a context-sensitive menu generation module 78, each of which is described below in greater detail in relation to FIG. 6.

In one embodiment, the system 60 also includes a relationships display module 80, which is described below in greater detail in relation to FIG. 7. The relationships display module 80 is depicted as including a query formulation module 82 and a query initiation module 84. However, in alternative embodiments, the three modules 80,82, and 84 may exist independently of each other. The system 60 may also include a connections display module 86 in one embodiment.

Each of the above-identified modules may be implemented, for example, as plug-ins, ActiveX™ controls, and/or Java™ applets in conjunction with the document viewer 62, although a variety of other implementations are possible within the scope of the invention. Those skilled in the art will recognize that some of the above-described modules may be implemented, in one embodiment, within portions of the operating system 25 or the knowledge portal 46.

Figure 3:
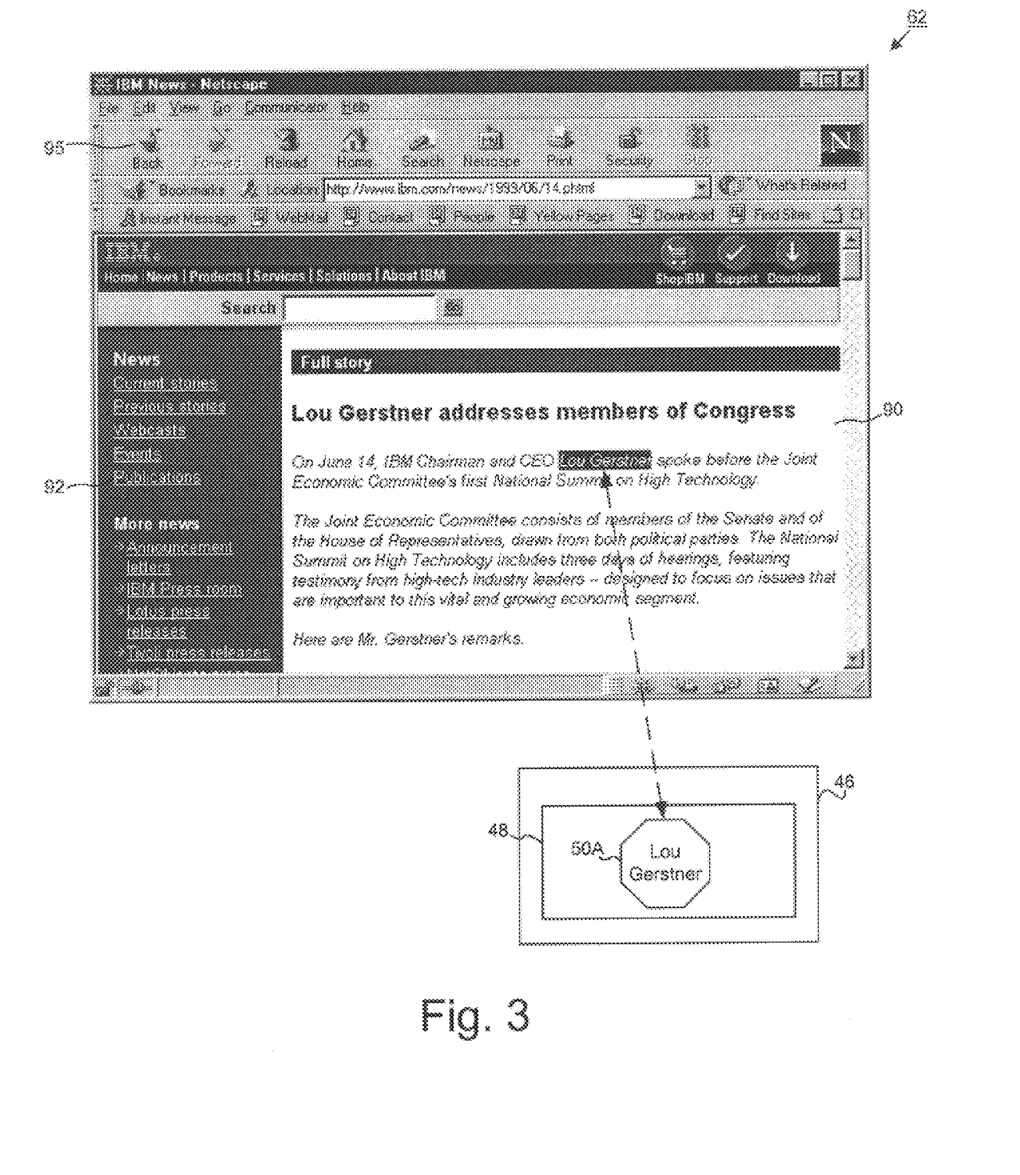
FIG. 3 is an illustration of a document viewer according to one embodiment of the invention, including a schematic connection to a knowledge portal.

Referring now to FIG. 3, a document viewer 62 is depicted as displaying a document 90. In one embodiment, the document viewer 62 is a conventional Web browser, and the document 90 is a Web document, although the invention is not limited in this respect.

The document 90 may be encoded in the HyperText Markup Language (HTML), and may include one or more displayable elements, including words, graphical objects, and the like. Some of the displayable elements may comprise hyperlinks 92, which, when activated, may direct the document viewer 62 to a different portion of the same document 90, or to an entirely different document 90. As illustrated in FIG. 3, a typical document viewer 62 underlines hyperlinked text to distinguish a hyperlink 92 from regular text.

As previously noted, a user may, while reading a document 90 displayed by a document viewer 62, identify a word or phrase corresponding to an object 50 represented in a knowledge catalog 48 of a knowledge portal 46. For example, the user may read within a document 90 a name, i.e. "Lou Gerstner," which may correspond to an object 50A. The user may desire to know the objects 50 in the knowledge catalog 48 related to the "Lou Gerstner" object 50A.

Figure 4:
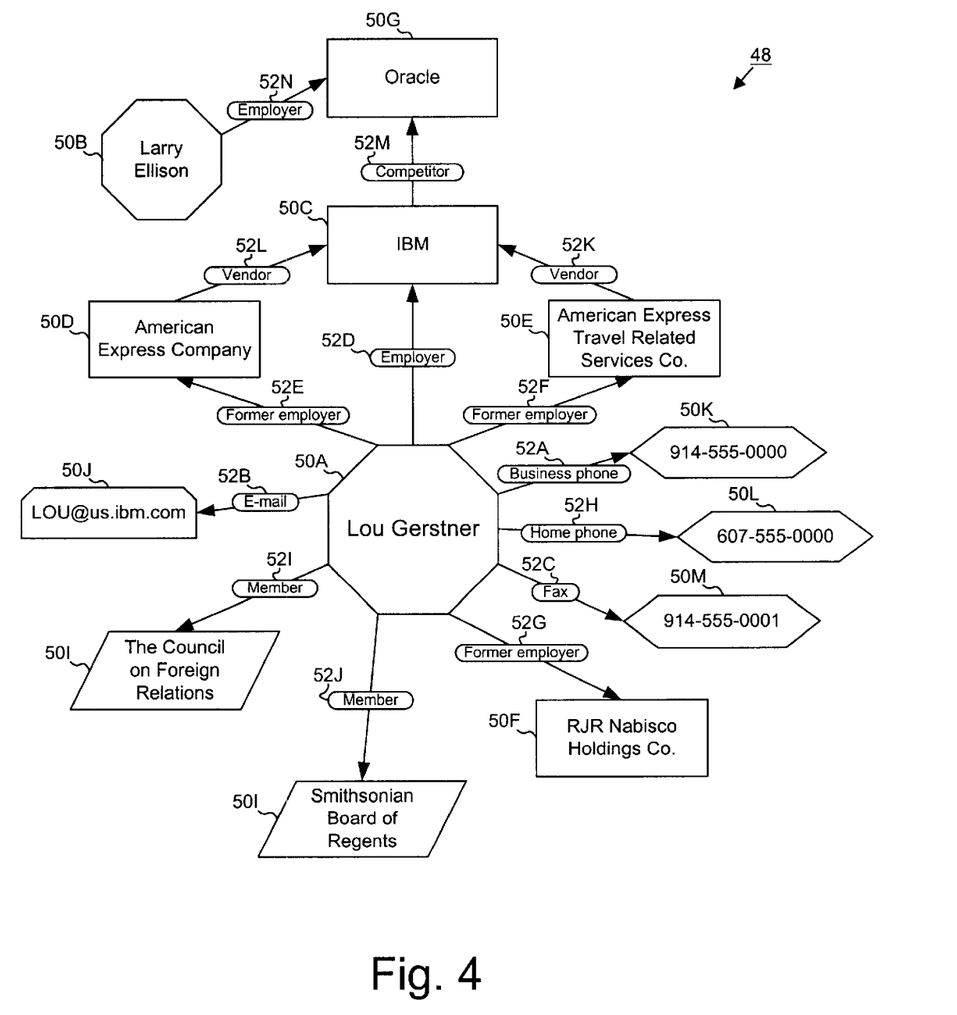
FIG. 4 is an illustration of a knowledge catalog according to one embodiment of the invention.

FIG. 4 is a node graph illustrating a portion of a knowledge catalog 48 in which objects 50 are represented as nodes and relationships 52 are represented as edges. As previously noted, the objects 50 may include different classifications or types, such as, for example, individuals (50A-B), companies (50C-G), organizations (50H-I), e-mail addresses (50J), and telephone numbers (50K-M). Moreover, the objects 50 may be linked by various relationships 52A-N. A wide variety of other types of objects 50 and relationships 52 may be provided within the scope of the invention.

Potentially, the author of the document 90 anticipated the user's interest and included a hyperlink 92 or other mechanism configured to query the knowledge portal 46 and selectively retrieve and display the related objects 50.

More realistically, however, such a hyperlink 92 or mechanism is not included. As a result, the user is conventionally forced to manually open a knowledge portal client 64 (if not currently open), formulate an appropriate query to retrieve the related objects 50, and manually initiate the query.

Figure 5:
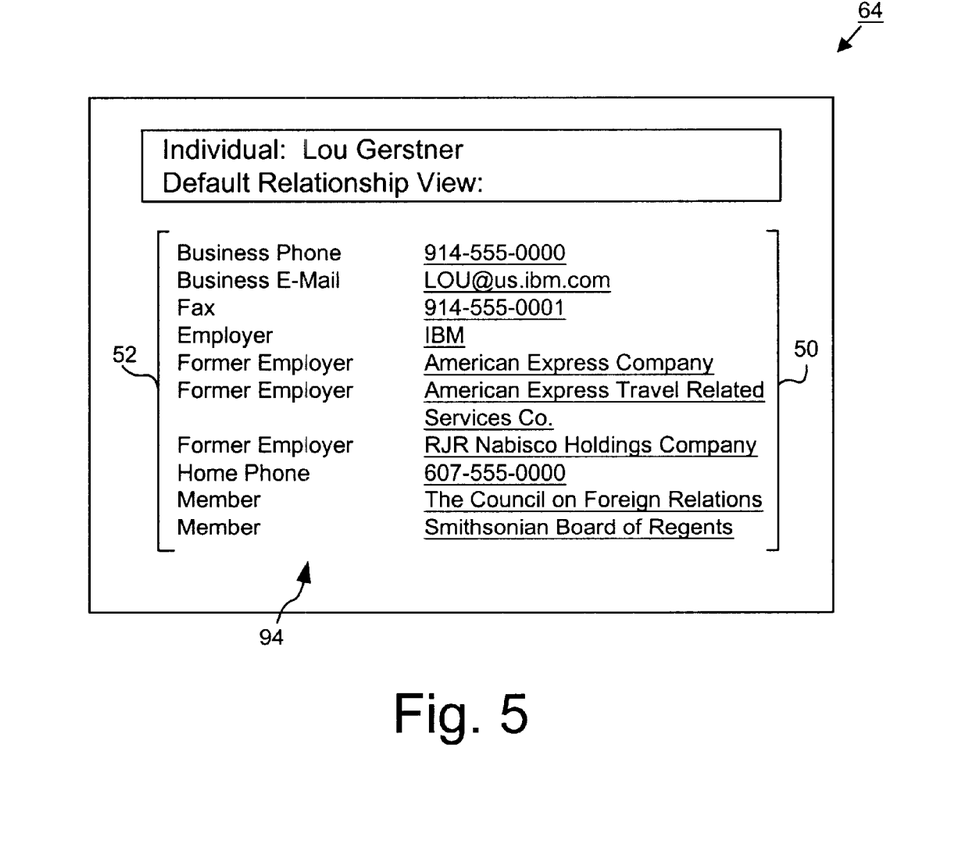
FIG. 5 is an illustration of query results displayed by a knowledge portal client according to one embodiment of the invention.

FIGS. 5 illustrates a knowledge portal client 64 displaying a set of query results 94 generated by the knowledge portal 46 in response to a user query. The depicted embodiment includes a tabular display of the objects 50 in the knowledge catalog 48 related to the "Lou Gerstner" object 50A, as well as the specific relationships 52 thereto. In an alternative embodiment, the knowledge portal client 64 may display a graphical representation of the objects 50 and relationships 52, similar to the node graph of FIG. 4.

Unfortunately, many users find the above-described process too time-consuming or complicated for casually querying a knowledge portal 46. Moreover, if the same Web browser or knowledge portal client 64 is used to query the knowledge portal 46 as was used to display the document 90 including the desired word or phrase, the user's context, i.e. point of reference within the document 90, is lost each time the knowledge portal interface replaces the document 90.

To return to the original document 90 and restore the user's context, the user must conventionally click on a "Back" button 95 (shown in FIG. 3), or the like, introducing yet another step into the process. Moreover, it is frequently impossible to restore the user's context to the state in which it existed before the query was performed.

Accordingly, in order to solve the foregoing problems, the present invention provides a system and method by a which a user can automatically initiate a knowledge portal query from within a document 90 displayed by a document viewer 62, without losing his or her context during the query process.

Figure 6:
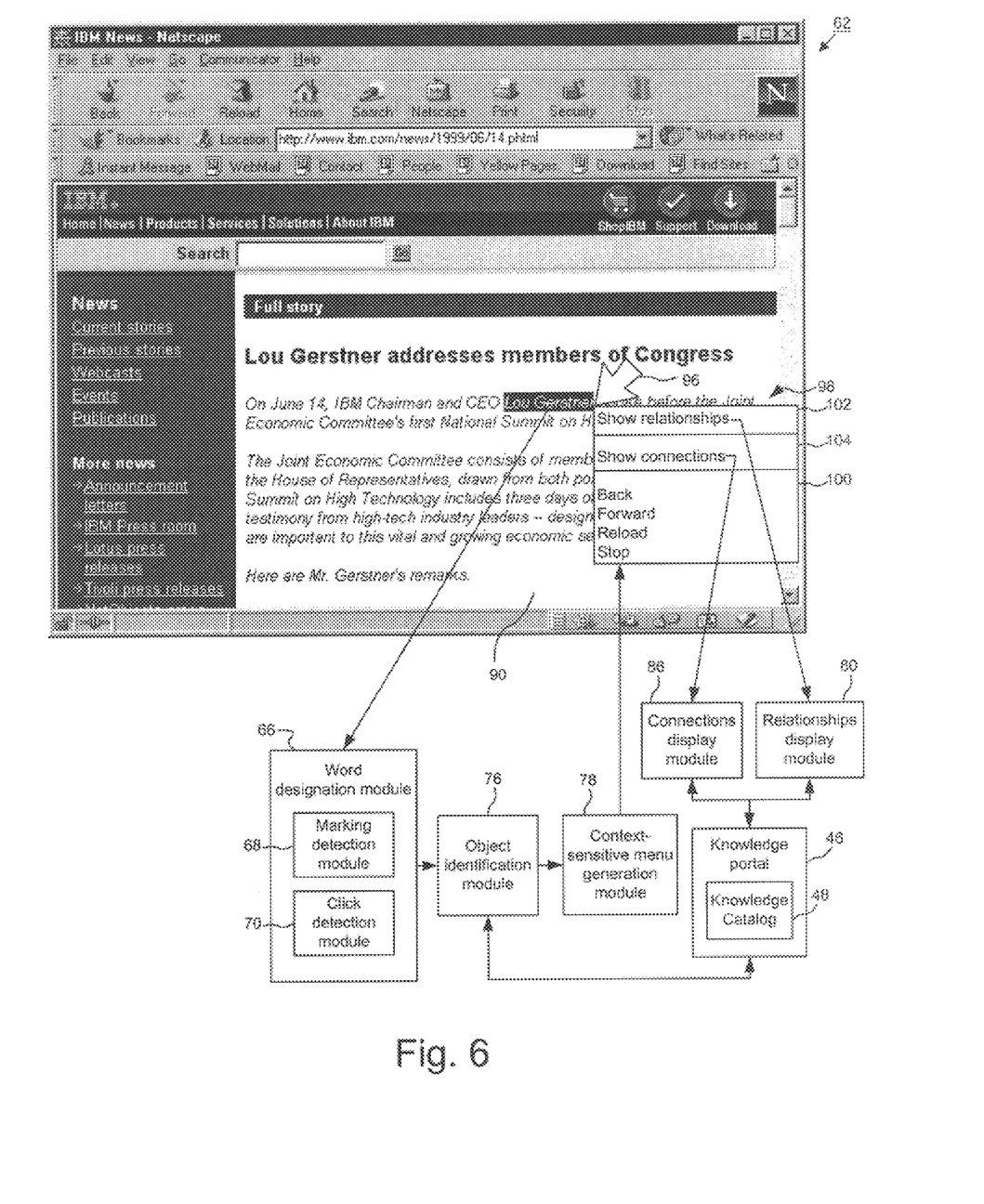
FIG. 6 is an illustration of a document viewer according to one embodiment of the invention, including schematic connections to a word designation module, an object identification module, a context-sensitive menu generation module, a connections display module, a relationships display module, and a knowledge portal.

In accordance with the present invention, as illustrated in FIG. 6, a user initially designates one or more words of a document 90. Preferably, the user does so by blocking, highlighting or otherwise marking the designated words within the document viewer 62. Most document viewers 62 provide mechanisms for marking text, although such mechanisms are provided for reasons apart from initiating a knowledge portal query.

A user may, for instance, position a pointer 96, by means of a mouse or other pointing device, on the first designated word (i.e. "Lou") and, while holding down the left mouse button, drag the pointer 96 to the last designated word (i.e. "Gerstner"). As a result, a typical document viewer 62 may block or highlight the selected words, "Lou Gerstner." Preferably, the user may confirm his or her designation of words by clicking the right mouse button or the like.

In an alternative embodiment, the user may designate a single word by simply positioning the pointer 96 over the designated word and clicking the right mouse button. In yet another embodiment, the middle mouse button (if available), may be used for the same purpose. In still another embodiment, clicking twice with the right mouse button on a word, within a Microsoft Windows™-type environment, causes the word to be blocked or highlighted.

In one embodiment, the word designation module 66 receives the user-designated word or words by means of the marking detection module 68 and the click detection module 70. For example, the marking detection module 68 is used in one embodiment to detect blocked, highlighted, or otherwise marked words. Similarly, where a user has clicked on a single word with the right mouse button, the click detection module 70 may detect the designated word.

After the user has confirmed the designation of one or more words by clicking the right mouse button or the like, the object identification module 76 identifies a designated object 50 within the knowledge catalog 48 corresponding to the designated word(s). In one embodiment, each object 50 within the knowledge catalog 48 has a name by which it may be identified. Accordingly, the object identification module 76 may query the knowledge portal 46 to identify an object 50 having a name similar or identical to the designated word(s). If no such object 50 exists in the knowledge catalog 48, the object identification module 76 may so notify the user.

In one embodiment, after the object identification module 76 has identified the designated object 50, the context-sensitive menu generation module 78 generates and displays a context-sensitive menu 98 within the document viewer 62. Conventionally, a context-sensitive menu 98 is displayed whenever a user clicks the right mouse button within a Microsoft Windows™-compatible application. Normally, the context-sensitive menu 98 includes a variety of standard options 100, depending, for example, on the type of the application, the state of the application, the location of the pointer 96 within the application when the right mouse button is clicked, and the like.

For example, as shown in FIG. 6, the context-sensitive menu 98 within a Web document viewer 62 may display such standard options 100 as "Back," "Forward," "Reload," "Stop," and the like. These options 100 conventionally allow a user to navigate the World Wide Web.

In one embodiment, the context-sensitive menu generation module 66 adds a "Show relationships" query option 102 or the like to the standard context-sensitive menu 98. Preferably, as described hereafter in relation to FIG. 7, the "Show relationships" query option 102 is used to invoke the relationships display module 80, which initiates a query of the knowledge portal 46 to selectively retrieve and display the objects 50 within the knowledge catalog 48 related to the designated object 50.

In one embodiment, the context-sensitive menu generation module 78 also adds a "Show connections" query option 104 or the like to the context-sensitive menu 98. Preferably, the "Show connections" query option 104 is used to invoke the connections display module 86, which generates a node graph showing the relationships 52 between two or more designated objects 50.

In alternative embodiments, a wide variety of other query options may be added to the context-sensitive menu 98. For example, query options may be added for selectively limiting the number and type of objects 50 and relationships 52 to be displayed in the query results 94. One or more query options, for instance, may be added corresponding to specific types of objects 50 for which relationship 52 information is sought. The following are examples of various query options that may be added to the context-sensitive menu 98 in one embodiment:

Customize default relationships

Show relationships to organizations

Show relationships to people

Show relationships to documents

Show relationships to places

Show relationships to events

A number of additional query options may be provided within the scope of the invention. Preferably, the query options added by the context-sensitive menu generation module 78 are separated from the standard options 100 within the context-sensitive menu 98, and may be displayed first within the context-sensitive menu 98 for convenience of selection.

After the context-sensitive menu 98 is displayed, the user may select one of the query options, for example, by moving the pointer 96 over the desired option and clicking the left mouse button.

Figure 7:
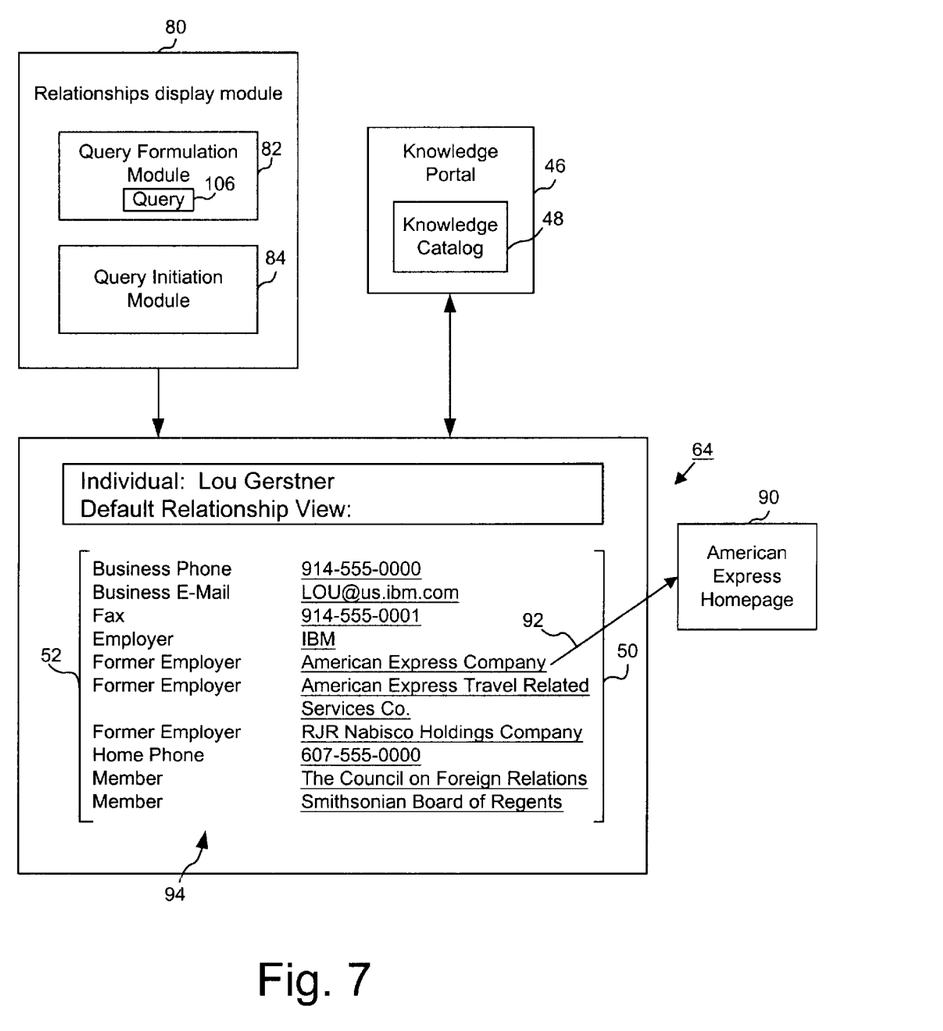
FIG. 7 is an illustration of a knowledge portal client according to one embodiment of the invention, including schematic connections to a relationships display module and a knowledge portal.

If the user selects the "Show relationships" query option 102, the relationships display module 80 automatically formulates and initiates a knowledge portal query 106, as shown in FIG. 7. As used herein, the term "automatically" indicates an operation performed by a module of the above-described system 60 without the requirement of user intervention.

In the depicted embodiment, the query formulation module 82 automatically formulates a knowledge portal query 106 configured to selectively retrieve the objects 50 in the knowledge catalog 48 related to the designated object 50. As noted above, the user may limit, in certain embodiments, the types and number of objects 50 and relationships 52 to be retrieved in the query 106.

The format of the knowledge portal query 106 may vary, for example, depending on the type of knowledge portal 46 and knowledge portal client 64 in use. For instance, if the knowledge portal client 64 is a Web browser, the knowledge portal query 106 may be embodied within a Uniform Resource Locator (URL) and may employ the Common Gateway Interface (CGI), which is a specification for transferring information between a Web browser and a program, such as a knowledge portal 46.

In one embodiment, after the query 106 is formulated, the query initiation module 84 automatically directs the knowledge portal 46 to initiate (execute) the knowledge portal query 106. Preferably, the query initiation module 84 automatically creates (or opens) a new (or existing) instance of a knowledge portal client 64. Thereafter, the query initiation module 84 provides the knowledge portal client 64 with the formulated query 106.

Where, for example, the knowledge portal client 64 is a Web browser, the query initiation module 84 may create a new instance of the Web browser and pass the Web browser a URL, which directs the Web browser to the knowledge portal 46 and initiates the query 106 thereon.

As illustrated in FIG. 7, the knowledge portal client 64 preferably transmits the query 106 to the knowledge portal 46. Thereafter, the knowledge portal 46 responds, in one embodiment, by generating the query results 94, which may be displayed by the knowledge portal client 64.

In the depicted embodiment, the query results 94 include one or more representations of objects 50 and relationships 52. In one embodiment, a displayed object 50 or relationship 52 may comprise a hyperlink 92, which, when activated, directs the knowledge portal client 64 or a separate Web browser to an associated Web document 90. For example, if the, user clicks on the "American Express Company" hyperlink 92, the user is taken to the homepage of American Express, i.e. "www.americanexpress.com."

The present invention, unlike conventional systems, does not require the user to manually open a knowledge portal client 64, formulate an appropriate query 106, and manually initiate the query 106. By merely marking the designated word(s) in the document 90 and clicking on the right mouse button, the query results 94 are automatically generated in a manner transparent to the user.

Moreover, in a preferred embodiment, the user's context within the original document 90 may be preserved throughout the query process. In one embodiment, where the document viewer 62 is also used as the knowledge portal client 64 (as in the case of a single Web browser), the document viewer 62, itself, may be used to query the knowledge portal 46. However, the user's context would be lost when the interface for the knowledge portal 46 replaces the document 90 in the document viewer 62.

In a preferred embodiment, however, the knowledge portal client 64 is displayed in a separate window, preserving the user's context within the original document 90. Preferably, a separate instance of the knowledge portal client 64 is generated (or opened), which is used to query the knowledge portal 46 and display the query results 94.

Figure 8:
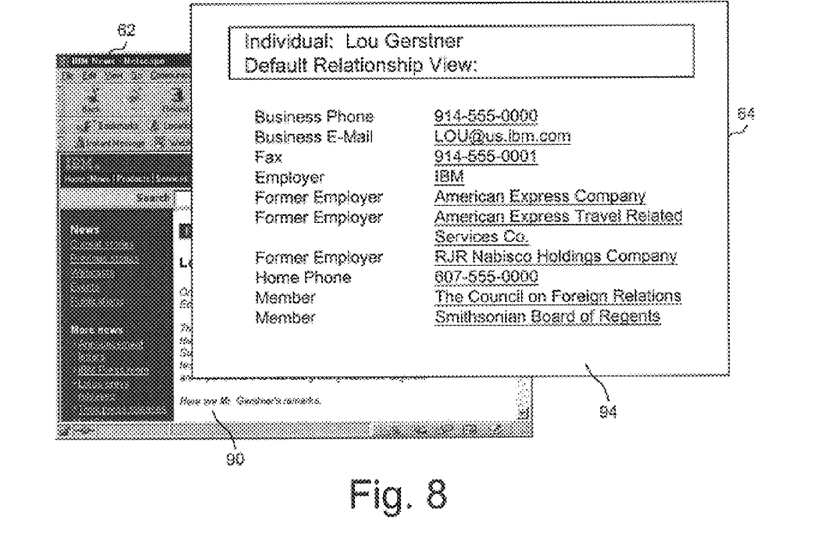
FIG. 8 is an illustration of a document viewer and a knowledge portal client concurrently displayed according to one embodiment of the invention.

For example, as illustrated in FIG. 8, the separate instance of the knowledge portal client 64 may partially overlap the document viewer 62. This embodiment may be valuable, for instance, where the user's displayable screen area is reduced when operating at a low resolution. Nevertheless, both the document 90 and the query results 94 are at least partially visible at the same time.

Figure 9:
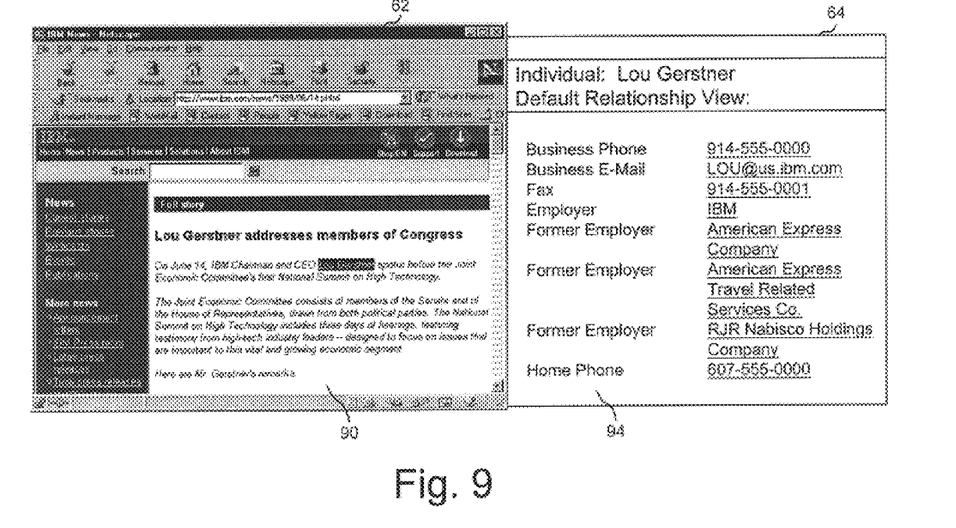
FIG. 9 is an illustration of a document viewer and a knowledge portal client concurrently displayed according to one embodiment of the invention.

In a preferred embodiment, as shown in FIG. 9, sufficient screen area may be provided in which to display the knowledge portal client 64 without obstructing the display of the document 90 by the document viewer 62. Thus, the user may maintain his or her context within the document 90, while viewing the query results 94.

Figure 10:
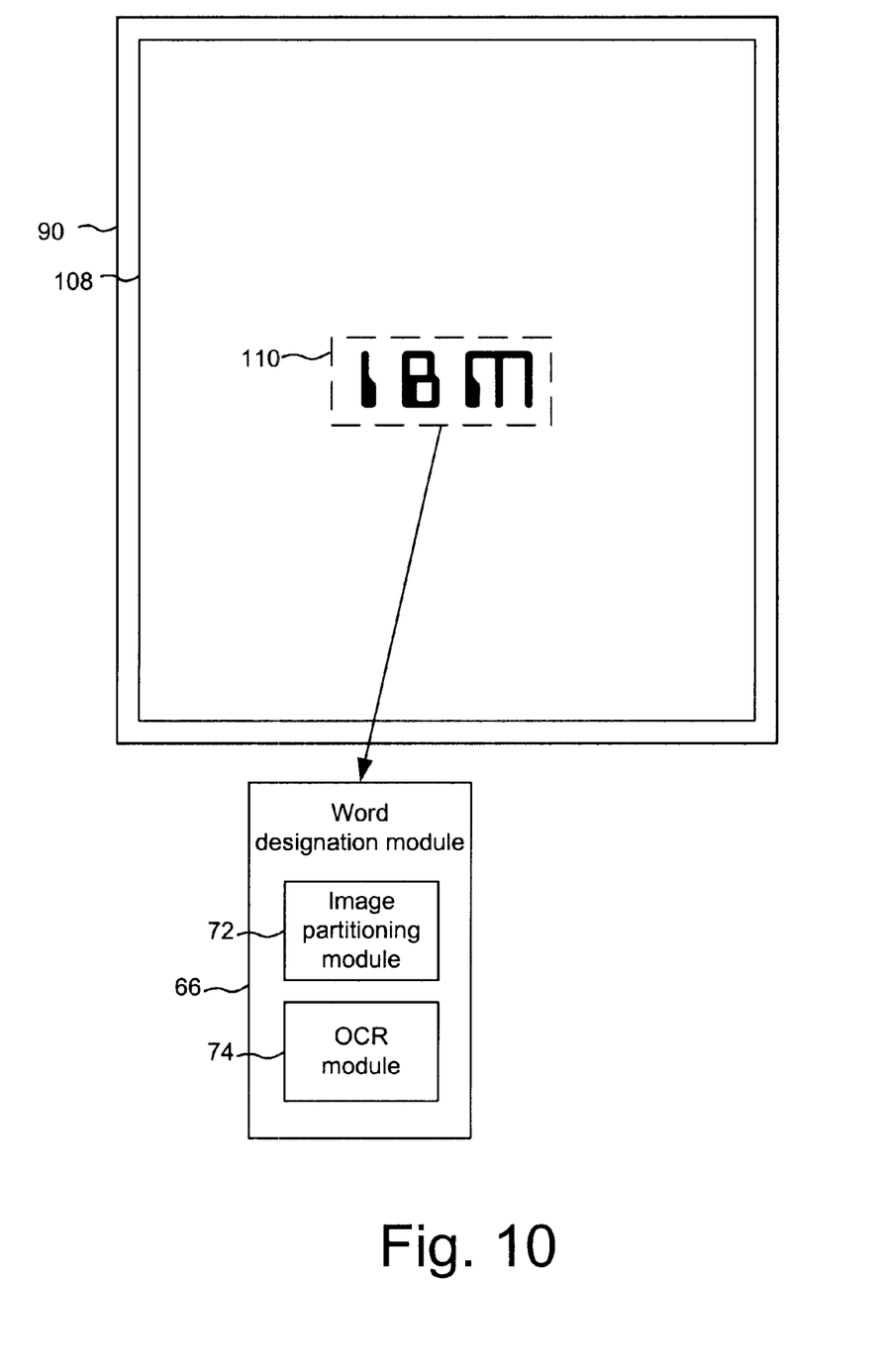
FIG. 10 is an illustration of an image and a schematic connection to a word designation module according to one embodiment of the invention.

As illustrated in FIG. 10, a document 90 may include, in certain instances, graphical objects that appear as text, but are actually bitmapped (raster) images 108. This is particularly common for stylized logos and the like, but is also frequently the case for entire pages of a document 90. In such cases, a typical document viewer 62 is not capable of blocking or highlighting the "words" contained within the images 108, such that the word designation module 66 may identify the designated words.

Accordingly, in one embodiment, the image partitioning module 72 allows a user to partition the image 108 into a least one image portion 110. Preferably, the image partitioning module 72 allows the user to draw a box or the like around one or more desired "words" within an image 108. In one embodiment, the image partitioning module 72 returns the rectangular coordinates within the image 108 of the user-selected image portion 110.

Thereafter, the OCR module 74 may process the image portion 110 using standard optical character recognition techniques in order to recognize one or more designated words contained therein. Optical character recognition systems are well known to those skilled in the art. After the designated word or words are recognized, the system 60 may proceed as described above.

Figure 11:
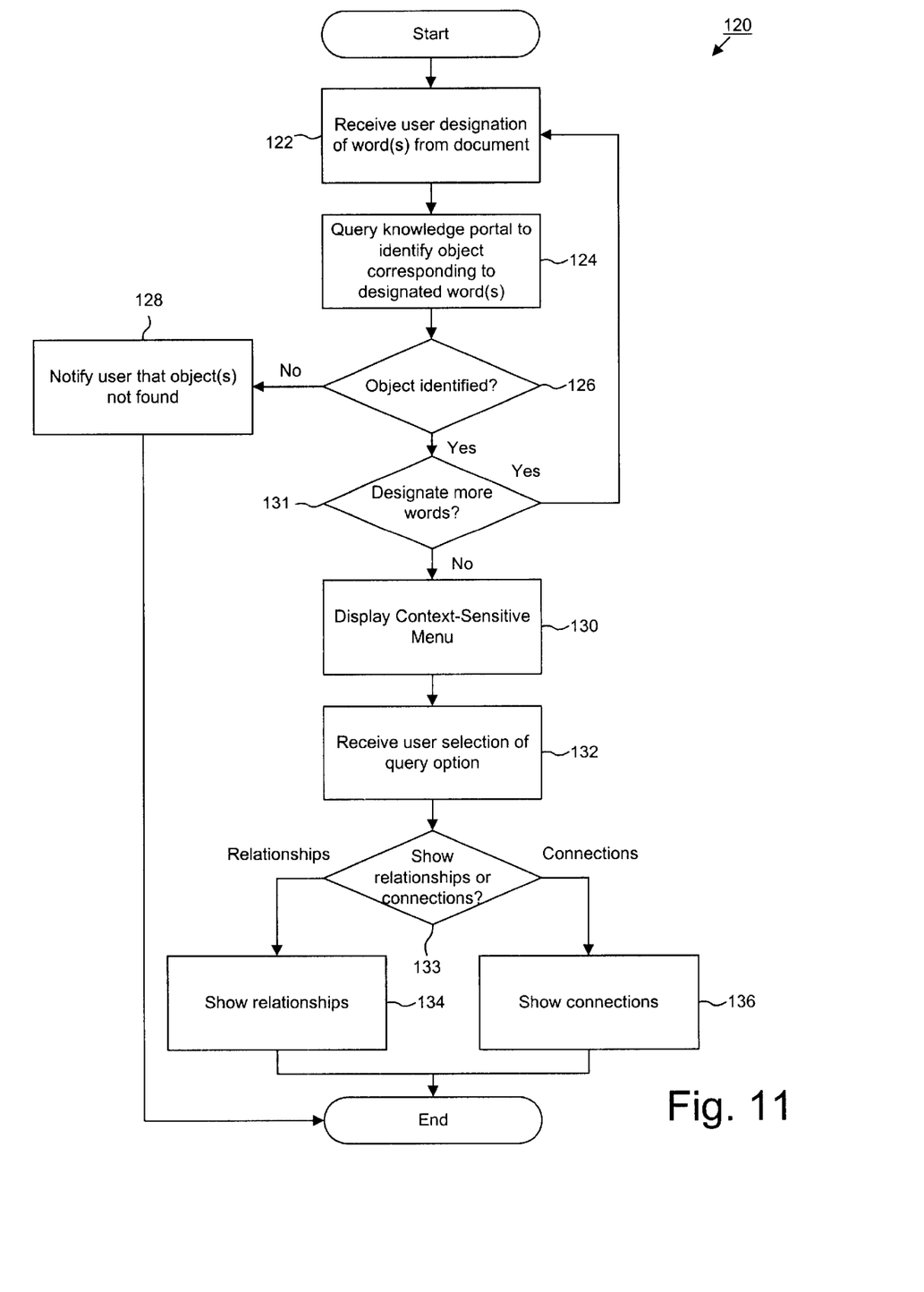
FIGS. 11 and 12 are schematic flowcharts of a method for automatically initiating a knowledge portal query from within a displayed document according to one embodiment of the invention.

Referring now to FIG. 11, a schematic flowchart illustrates a method 120 for automatically initiating a knowledge portal query 106 from within a displayed document 90. The method 120 begins by receiving 122 a user designation of one or more words from a document 90 displayed by a document viewer 62.

The words may be designated in any suitable manner. For instance, the words may be designated, in one embodiment, by blocking, highlighting, or otherwise marking the words, and then by clicking the right mouse button or the like. In another embodiment, the user may designate a single word by simply right clicking on a word.

After the word(s) are designated, the method 120 continues by querying 124 a knowledge portal 46 to identify an object 50 contained with the portal's knowledge catalog 48 corresponding to the designated word(s). A check 126 is then made to determine whether a corresponding object 50 was identified. If not, the method 120 continues by notifying 128 the user that a corresponding object 50 was not found, after which the method 120 is complete.

If, however, a corresponding object 50 is found in the knowledge catalog 48, the method 120 continues by determining 131 whether the user wishes to designate more words. The ability to designate additional words may be useful, in one embodiment, where the user wishes to show the connections between two or more designated objects 50. The user may select additional words, for example, by holding down the control key while blocking, highlighting, or otherwise marking the additional words in the same manner as the initial words were designated. If the user wishes to designate additional words, the method 120 returns to step 122.

If, however, no additional words are designated, the method 120 continues by displaying 130 a context-sensitive menu 94 in response to the user's confirmation of the designated word(s). The user may, in one embodiment, confirm the designation by clicking the right mouse button.

As previously noted, the context-sensitive menu 94 may include a number of standard options 100, as well as one or more query options 102, 104. After the menu 94 is displayed, the method 120 continues by receiving a user selection of a query option 102, 104. A check 133 is made as to which query option 102, 104 is selected by the user. If the "Show relationships" query option 102 is selected, the method 120 continues with step 134. If, however, the "Show connections" query option 104 is selected, the method 120 continues with step 136. Similarly, if other query options are displayed in the context-sensitive menu 98, the user may select one of those options.

Figure 12:
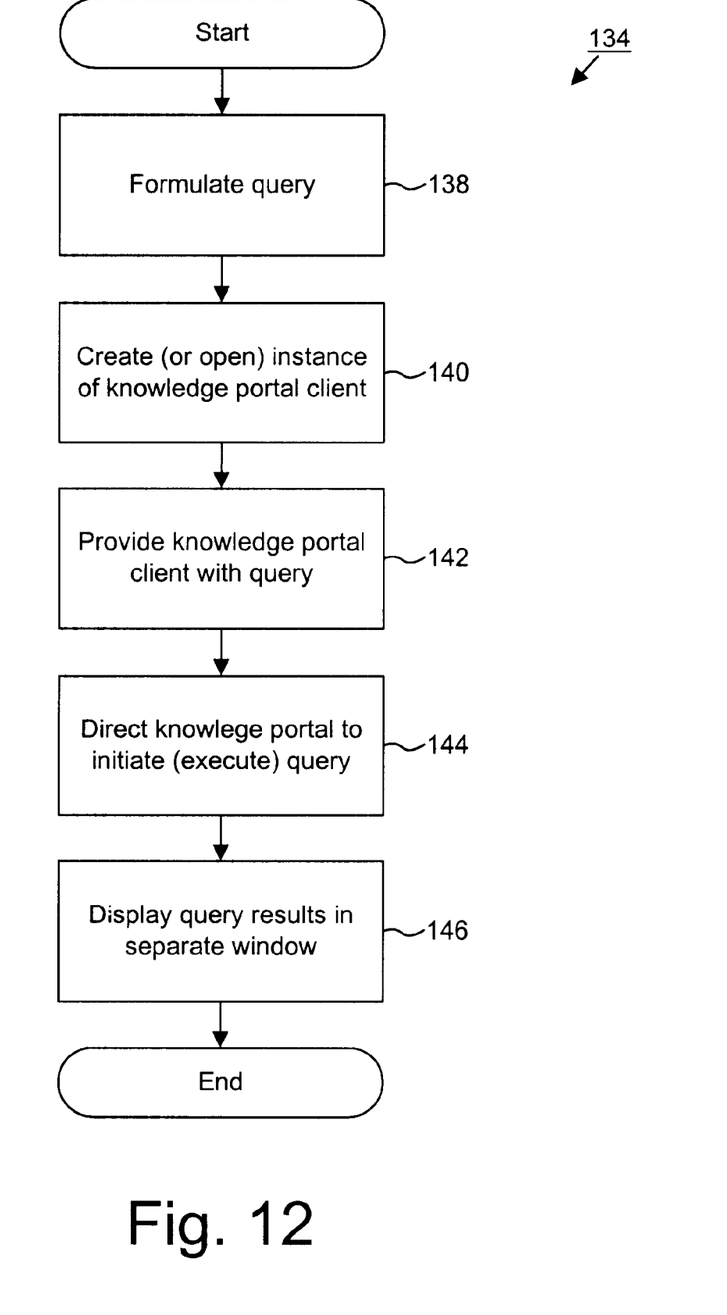

In one embodiment, the "show relationships" step 134 is more fully described in FIG. 12. The method 120 continues by formulating 138 a knowledge portal query 106 configured to selectively retrieve the objects 50 in the knowledge catalog 48 related to the designated object 50. As noted above, the user may limit, in certain embodiments, the types and number of objects 50 and relationships 52 to be retrieved in the query.

The format of the knowledge portal query 106 will vary, for example, depending on the type of knowledge portal 46 and knowledge portal client 64 in use. For instance, if the knowledge portal client 64 is a Web browser, the knowledge portal query 106 may be embodied within a Uniform Resource Locator (URL) and employ the Common Gateway Interface (CGI).

After the query 106 is formulated, the method 120 continues by automatically creating 140 (or opening) a new (or existing) instance of a knowledge portal client 64. Thereafter, the method 120 proceeds by automatically providing 142 the formulated query 106 to the knowledge portal client 64.

After the knowledge portal client 64 has received the query 106, the method 120 continues by automatically directing 144 the knowledge portal 46 (via the knowledge portal client 64) to initiate (execute) the query 106 to generate the query results 94 (including one or more objects 50 related to the designated object 50). Thereafter, the knowledge portal client 64 may receive the query results 94 from the knowledge portal 46, after which the method 120 displays 146 the query results 94 in a separate window, i.e. separate from the window provided by the document viewer 62.

From the foregoing description, the present invention offers numerous advantages over conventional systems. For example, unlike conventional systems, a user is not required to manually open a knowledge portal client 64, formulate an appropriate query 106 to retrieve related objects 50, and manually initiate the query 106. By merely designating one or more words within a document 90 and clicking on the right mouse button, the query results 94 automatically generated in a manner transparent to the user.

Moreover, in a preferred embodiment, the user's visual and mental context within the original document 90 is preserved throughout the query process. The user is allowed to view the document 90 and query results 94 at the same time using a suitable display device.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for automatically initiating a query of a knowledge portal from within a displayed document, the knowledge portal storing a plurality of objects linked by one or more relationships, the document displayed by a document viewer and comprising one or more words, the system comprising:

a word designation module configured to receive a user designation of at least one word of the document;

an object identification module configured to automatically identify a single object within the knowledge portal corresponding to the at least one designated word;

a query formulation module configured to automatically formulate a query for identifying at least one additional object within the knowledge portal having a relationship with the single object, the at least one additional object comprising a non-navigational information item;

a query initiation module configured to automatically direct the knowledge portal to initiate the query; and a relationships display module configured to display to a user a representation of the one or more additional objects related to the single object and a relationship between the single object and each additional object.

2. The system of claim 1, wherein the document viewer is selected from the group consisting of a Web browser, a knowledge portal client, a word processor, and a portable document format (PDF) reader.

3. The system of claim 1, wherein the word designation module comprises:

a marking detection module configured to permit a user to designate the at least one word by marking one or more words of the document.

4. The system of claim 1, wherein the word designation module comprises:

a click detection module configured to permit a user to designate the at least one word by clicking on a word of the document.

5. The system of claim 1, wherein the document comprises an image, the word designation module comprising:

an image partitioning module configured to receive a user selection of at least a portion of the image; and an optical character recognition (OCR) module configured to perform optical character recognition on the selected portion of the image to recognize therein the at least one designated word.

6. The system of claim 1, further comprising:

a context-sensitive menu generation module configured to display, in response to receiving a user designation of a word, a context-sensitive menu including a user selectable option for initiating the query.

7. The system of claim 6, wherein the context-sensitive menu is displayed in response to a user designating at least one word and clicking on a right mouse button.

8. The system of claim 1, wherein the relationships display module is further configured to display to a user a representation of the relationship between the single object and the at least one additional object.

9. The system of claim 1, wherein the document viewer is configured to display the document in a first window and the relationships display module is configured to display the representation of the at least one additional object in a second window on a common display device.

10. A computer-implemented method for automatically initiating a query of a knowledge portal from within a displayed document, the knowledge portal storing a plurality of objects linked by one or more relationships, the document displayed by a document viewer and comprising one or more words, the method comprising:

receiving a user designation of at least one word of the document;

automatically identifying a single object within the knowledge portal corresponding to the at least one designated word;

automatically formulating a query for identifying at least one additional object within the knowledge portal having a relationship with the single object, the at least one additional object comprising a non-navigational information item;

automatically directing the knowledge portal to initiate the query; and displaying to a user a representation of the one or more additional objects related to the single object and a relationship between the single object and each additional object.

11. The method of claim 10, wherein the document viewer is selected from the group consisting of a Web browser, a knowledge portal client, a word processor, and a portable document format (PDF) reader.

12. The method of claim 10, wherein receiving a user designation of at least one word of the document comprises:

permitting a user to designate the at least one word by marking one or more words of the document.

13. The method of claim 10, wherein receiving a user designation of at least one word of the document comprises:

permitting a user to designate the at least one word by clicking on a word of the document.

14. The method of claim 10, wherein the document comprises an image, and wherein receiving a user designation of at least one word of the document comprises:

receiving a user selection of a portion of the image; and performing optical character recognition on the selected portion of the image to recognize therein the at least one designated word.

15. The method of claim 10, further comprising:

displaying, in response to receiving a user designation of a word, a context-sensitive menu including a user selectable option for initiating the query.

16. The method of claim 15, wherein the context-sensitive menu is displayed in response to a user designating at least one word and clicking on a right mouse button.

17. The method of claim 10, further comprising:

displaying to a user a representation of the relationship between the single object and the at least one additional object.

18. The method of claim 10, wherein displaying to a user a representation of the at least one additional object related to the first object comprises:

displaying the document in a first window; and displaying the representation of the at least one additional object in a second window on a common display device.

19. An article of manufacture comprising a program storage medium readable by a processor and embodying one or more instructions executable by the processor to perform a computer-implemented method for automatically initiating a query of a knowledge portal from within a displayed document, the knowledge portal storing a plurality of objects linked by one or more relationships, the document displayed by a document viewer and comprising one or more words, the method comprising:

receiving a user designation of at least one word of the document;

automatically identifying a single object within the knowledge portal corresponding to the at least one designated word;

automatically formulating a query for identifying at least one additional object within the knowledge portal having a relationship with the single objects the at least one additional object comprising a non-navigational information item;

automatically directing the knowledge portal to initiate the query; and displaying to a user a representation of the one or more additional objects related to the single object and a relationship between the single object and each additional object.

20. The article of manufacture of claim 19, wherein the document viewer is selected from the group consisting of a Web browser, a knowledge portal client, a word processor, and a portable document format (PDF) reader.

21. The article of manufacture of claim 19, wherein receiving a user designation of at least one word of the document comprises:

permitting a user to designate the at least one word by marking one or more words of the document.

22. The article of manufacture of claim 19, wherein receiving a user designation of at least one word of the document comprises:

permitting a user to designate the at least one word by clicking on a word of the document.

23. The article of manufacture of claim 19, wherein the document comprises an image, and wherein receiving a user designation of at least one word of the document comprises:

receiving a user selection of a portion of the image; and performing optical character recognition on the selected portion of the image to recognize therein the at least one designated word.

24. The article of manufacture of claim 19, further comprising:

displaying, in response to receiving a user designation of a word, a context-sensitive menu including a user selectable option for initiating the query.

25. The article of manufacture of claim 24, wherein the context-sensitive menu is displayed in response to a user designating at least one word and clicking on a right mouse button.

26. The article of manufacture of claim 19, further comprising:

displaying to a user a representation of the relationship between the single object and the at least one additional object.

27. The article of manufacture of claim 19, wherein displaying to a user a representation of the at least one additional object related to the first object comprises:

displaying the document in a first window; and displaying the representation of the at least one additional object in a second window on a common display device.

* * * * *